United States Patent [19]

Tanigaki et al.

[11] Patent Number: 5,406,323
[45] Date of Patent: Apr. 11, 1995

[54] IMAGE DISPLAY AND PICK-UP APPARATUS

[75] Inventors: Yasushi Tanigaki; Yoshikazu Satoh; Yoshiharu Kobayashi, all of Tokyo, Japan

[73] Assignee: U.S. Philips Corporation, New York, N.Y.

[21] Appl. No.: 188,348

[22] Filed: Jan. 28, 1994

Related U.S. Application Data

[63] Continuation of Ser. No. 691,656, Apr. 26, 1991, abandoned.

[30] Foreign Application Priority Data

Apr. 27, 1990 [JP] Japan .................. 2-113989

[51] Int. Cl.$^6$ .................. H04N 7/14; H04N 7/15
[52] U.S. Cl. .................. 348/15; 348/739; 348/14; 348/794
[58] Field of Search .................. 348/14, 15, 13, 739, 348/790, 751, 373, 335, 744, 794; H04N 7/14, 7/15; 434/307, 31

[56] References Cited

U.S. PATENT DOCUMENTS 3,755,623  8/1973  Cassagne .
4,403,216  9/1983  Yokoi .................. 358/236
4,928,301  5/1990  Smoot .................. 379/53
5,159,445  10/1992  Gitlin et al. .................. 348/14

FOREIGN PATENT DOCUMENTS 56-152387  1/1981  Japan .................. H04N 7/14
58-107786  6/1983  Japan .................. H04N 7/14
60003291  9/1985  Japan .................. H04N 9/12
62-258574  11/1987  Japan .................. H04N 7/14

Primary Examiner—James J. Groody
Assistant Examiner—Glenton B. Burgess
Attorney, Agent, or Firm—Norman N. Spain

[57] ABSTRACT

In an image pick-up and display apparatus comprising a liquid crystal display device (34), an image pick-up device (24) and a partially transparent mirror (36), the display device is arranged at the front side of the apparatus (30), the partially transparent mirror is disposed behind this device (32) in light paths respectively between the display device and the light source (38) for illuminating this display device and between the image pick-up device (24) and the display device (32), so that the received image can be displayed in a natural way and the optical information of a subject in front of the apparatus is not disturbed by light from the light source.

21 Claims, 4 Drawing Sheets

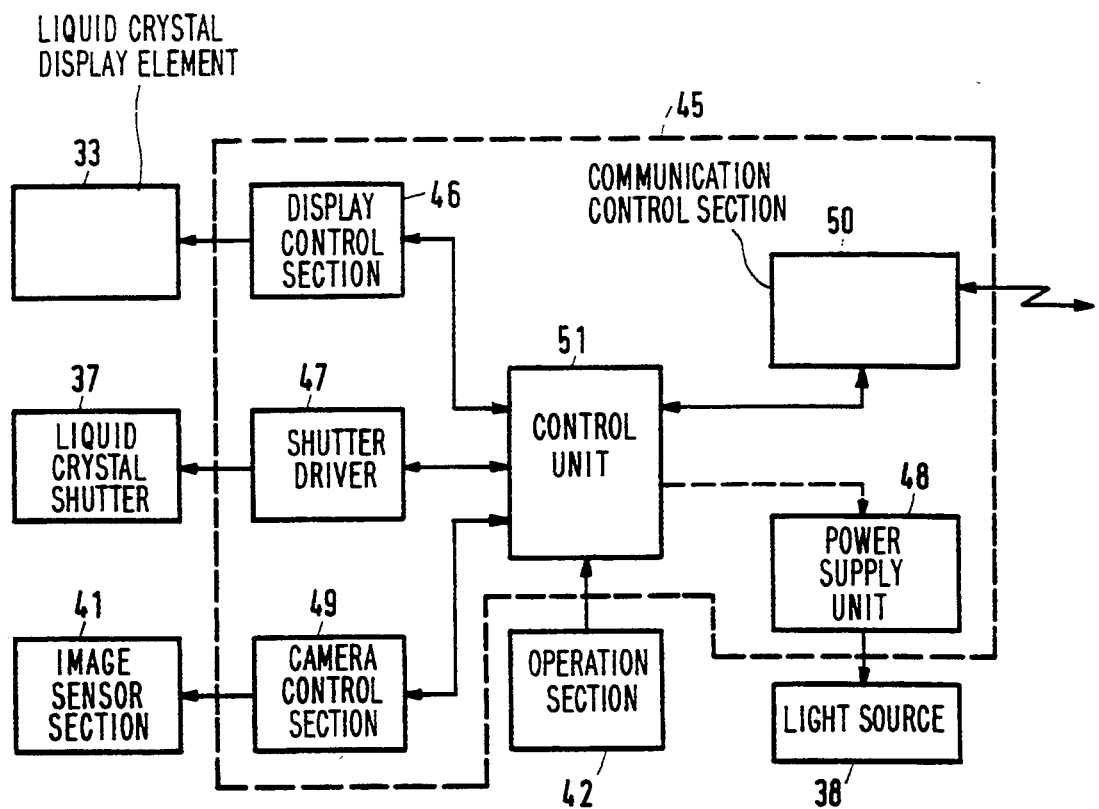
FIG.3
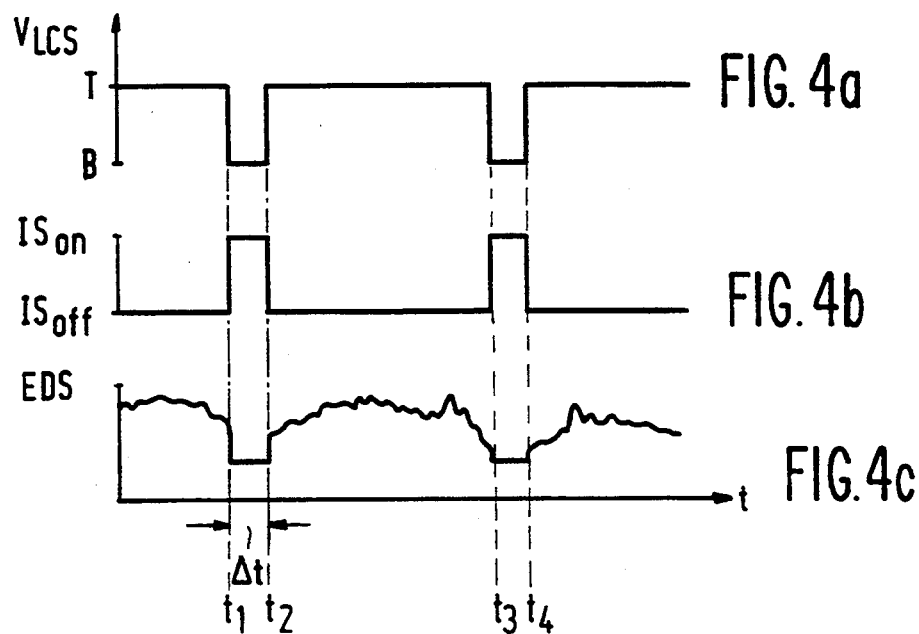

IMAGE DISPLAY AND PICK-UP APPARATUS

This is a continuation of application Ser. No. 07/691,656, filed Apr. 26, 1991, now abandoned.

BACKGROUND OF THE INVENTION

The invention relates to an image display and pick-up apparatus having an image pick-up section, an image display section and a partially transparent mirror.

Such apparatus, which is suitable for use in, for example, a video-telephone (so-called videophone) is known in various forms.

In one conventional image display and pick-up apparatus 10, shown in FIG. 7, CRT screen 11 for displaying a received image of a first user and an image pick-up section 12 for picking up an image of a second user in front of the apparatus are disposed adjacent to each other in a front face of the apparatus body. This apparatus has the disadvantage that, since a line of sight of the second user is not directed to the image pick-up section 12, but to the CRT screen 11, there is no eye contact between the two users.

In order to prevent this disadvantage the Japanese Patent Provisional Publication No. SHO 62-269128 proposes to arrange a semi-transparent mirror obliquely within the apparatus. An image displayed on a CRT arranged at a lower portion of the apparatus is reflected forwardly by the semi-transparent mirror, while an image of a user in front of the apparatus is picked up via the semi-transparent mirror by an image pick-up device arranged at a rear portion of the apparatus. This conventional apparatus however has the disadvantage that it gives an unnatural impression because the image displayed on the CRT is seen at the interior of the apparatus.

FIG. 8 shows an image display and pick-up apparatus 20 which is improved in this aspect. This apparatus comprises an inclined semi-transparent mirror 22 arranged behind a transparent front glass 21, a liquid crystal display device 23 at a location below the semi-transparent mirror, and an image pick-up device 24 at a location behind the central section of the semi-transparent mirror. The display device 23 comprises a liquid crystal display element 27, which is located between a pair of polarizing plates 25 and 26, and backlighting 28, and which is driven on the basis of a received image signal.

The image display and pick-up apparatus 20 still has the disadvantage of giving an unnatural impression because the image on the display device 23 is seen at a location symmetrical with respect to the semi-transparent mirror 22, that is, at a location far rearward of the semi-transparent mirror. Furthermore, the illumination from the backlighting 28 is diffusely reflected at the interior of the apparatus so that a considerable amount of the illumination can reach the image pick-up device 24. This light leakage mixes up with the light from the subject in front of the apparatus, so that this subject is not sufficiently picked up.

OBJECTS AND SUMMARY OF THE INVENTION

It is an object of this invention to provide an image display and pick-up apparatus in which an image can be displayed in a natural way.

Furthermore, another object of this invention is to provide an image display and pick-up apparatus in which a subject can be excellently picked-up without being influenced by the light from a display device.

An image display and pick-up apparatus according to this invention, comprising an image pick-up section, a display section and a partially transparent mirror, is characterized in that the display section comprises a liquid crystal display element of the type which is illuminated from the back thereof by a light from a light source, the liquid crystal display element is arranged at a front face portion of the apparatus, at a location behind the liquid crystal element, the partially transparent mirror is arranged rearwardly of said liquid crystal display element in light paths respectively between the light source and the liquid crystal display element and between the image pick-up section and the liquid crystal display element.

Since the image is displayed at the front face portion of the apparatus, this image has a natural appearance.

A preferred embodiment of the apparatus according to the invention is characterized in that an optical shutter for preventing a light beam emitted by the light source from reaching the partially transparent mirror is arranged in the optical path between the light source and the partially transparent mirror in the vicinity of said light source.

By a control unit, the optical shutter can be brought into a light blocking-state when the image pick-up section is in the operating state such that light from the light source cannot be mixed with that picked-up by the image pick-up section.

BRIEF DESCRIPTION OF THE DRAWING

Embodiments of the invention will be described below in detail with reference to the accompanying drawings, in which

FIG. 3 is a block diagram of the circuit of the first embodiment;

FIG. 4 is a time chart explaining the operation of the first embodiment;

DESCRIPTION OF THE PREFERRED EMBODIMENTS

Figure 1:
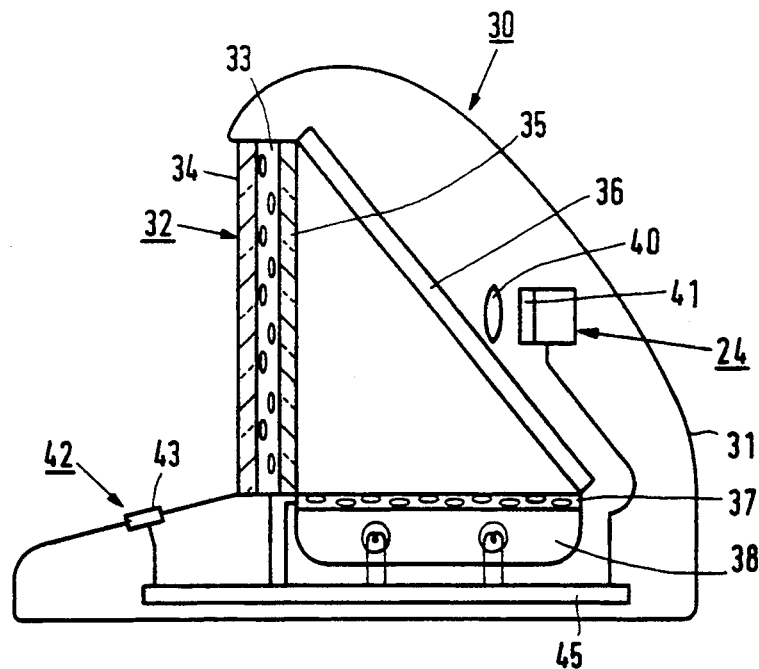
FIG. 1 is a cross-section of a first embodiment of the image display and pick-up apparatus according to the invention.

A first embodiment of the invention, in which an image display and pick-up apparatus according to the invention is applied to a video telephone, will be described with reference to FIGS. 1 through 4. This embodiment 30 comprises a display section 32, at a front face of a body 31. The display screen section 32 is composed of a liquid crystal display element 33 in the form of a planar plate located between a polarizing plate 34 on the front face side and a polarizing plate 35 on the rear face side. The liquid crystal display element 33 is a monochromatic matrix liquid crystal display element which uses a nematic liquid crystal, for example. A rectangular partially transparent, for example a semi-transparent, mirror 36 inclined substantially at 45 degrees to display 32 is arranged at the back of the display section 32 such that the semi-transparent mirror 36 has an upper end portion which is in contact with an upper portion of the screen section 32, and a lower end portion which is located rearwardly of the screen section 32. Further, an optical shutter, for example a liquid crystal shutter 37, in the form of a rectangular planar plate, is arranged substantially horizontally between the lower end portion of the display screen section 32 and the lower end portion of the semi-transparent mirror 36. The liquid crystal shutter 37 is, for example, of the type which utilizes DSM-type liquid crystal cells (which block light if a voltage is applied, and transmit light if no voltage is applied). Alternatively, the shutter may employ a plurality of capsules having enclosed therein TN-type liquid crystal, as liquid crystal cells (which for example, if a voltage of 100 V is applied, transmit light, while if no voltage is applied block, light). A light source unit 38 is arranged at a location adjacent to the lower face of the liquid crystal shutter 37, for emitting upwardly substantially parallel light rays through the liquid crystal shutter. For example, a plurality of small fluorescent lamps are used in the light source 38.

An image pick-up device 24 is arranged at a location behind a central portion of the semi-transparent mirror 36, for converting an image of a subject at the front of the apparatus 30, into an electrical signal, which image is supplied successively through the display screen section 32 and the semi-transparent mirror 36. The image pick-up device 24 comprises a camera lens system 40 and an image sensor section 41 which has an image sensor such as a CCD, and MOS device or the like and a drive circuit for the image sensor.

Figure 2:
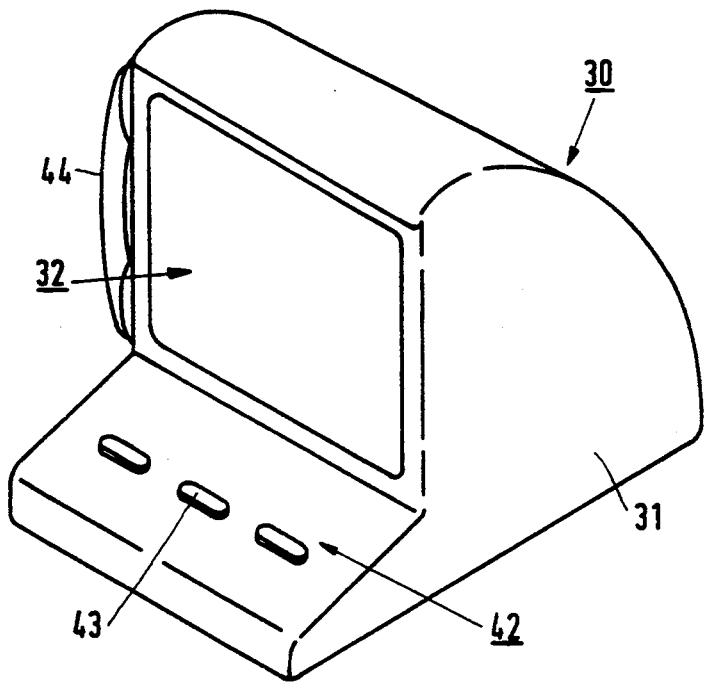
FIG. 2 is a perspective view of the first embodiment.

Furthermore, as shown in FIG. 2, the bottom portion of the apparatus body 31 extends forwardly to form an operation section 42. Various operation switches including a switch 43 for start of image pick-up are arranged at an upper face of the operation section. Moreover, a hand set 44 is arranged, for example, at the left-hand portion of the apparatus body 31.

The liquid crystal display element 33, the liquid crystal shutter 37, the light source 38, the image sensor section 41 and the operation section 42 illustrated in FIG. 1 are connected to various sections of a circuit 45 (shown in block diagram form in FIG. 3) on a circuit substrate which is arranged at the bottom portion of the apparatus body 31.

The circuit 45 of FIG. 3 comprises a display control section 46 for driving the liquid crystal display element 33 to form an image on this element, a shutter driver 47 for driving the liquid crystal shutter 37 to switch the same between a light blocking condition and a light transmitting condition, a power supply unit 48 for supplying power to various sections of the apparatus including the fluorescent lamps of the light source 38, a camera control section 49 for driving the image sensor section 41 to fetch the image signal obtained by the CCD or the like, and a communication control section 50 including a modem or the like for fetching information from a telephone line or for sending out information to the line, as well as a control unit 51, to which electric power is supplied from the power supply unit 48, and into which operation information from the operation section 42 is inputted, for controlling the various sections 46, 47, 49, 50 and the like.

The operation of the image display and pick-up apparatus will next be described.

In the display mode of the videophone, the fluorescent lamps of the light source 38 are turned on by the power supply unit 48. The image sensor section 41 is maintained in the inoperative condition by the camera control section 49 under the control of the control unit 51. Further, an image signal fetched by the display control section 47 from the telephone line is received by the communication control section 50, stored in an image memory within the control unit 51, and sent to the display control section 46 so that an image corresponding to the image signal is formed on the liquid crystal display element 33. The control unit 51 supplies, via the shutter drive section 47, to the liquid crystal shutter 37 such voltage (for example, a voltage of 100 V in case of a liquid crystal capsule shutter of TN type) that the shutter 37 is brought into the light transmitting condition. Thus, the light emitted from the light source 38 passes upwardly through the liquid crystal shutter 37 and, subsequently, is reflected substantially at right angles to the front of the apparatus by the semi-transparent mirror 36 so that the light illuminates the liquid crystal display element 33 from the back. Accordingly, the image formed on the liquid crystal display element 33 is clearly displayed on the display screen section 32.

Since the image is displayed at the front face of the apparatus body 31, the user sees the image in a natural way.

If at the time $t_1$ the user operates the switch 43 of the operation section 42 in order to send his own image, as indicated in a time chart in FIG. 4, the control unit 51 switches the image sensor section 41 to the operational condition through the camera control section 49 during a predetermined time interval $\Delta t = t_2 - t_1$ (for example, 10 msec through 50 msec) as illustrated in the second chart of FIG. 4 which shows the on (high level) Is on and off state (low level) Is off state of the image sensor. In synchronism therewith, the voltage VLCS, shown in the first chart of FIG. 4, applied to the liquid crystal shutter 37 via the shutter driver 47 is switched to such value B that the shutter is brought to the light blocking condition. Moreover, during the time interval $\Delta t$, the control unit 51 ensures via the display control section 46 that the liquid crystal display element as a whole is in the light transmitting condition. Thus, the image of the subject located in front of the apparatus body 31 successively passes through the liquid crystal display element 33, the semi-transparent mirror 36 and the camera lens system 40, and is supplied to the image sensor section 41, which converts the optical signal into an electrical signal. Since the illuminating light emitted from the light source 38 is cut off by the liquid crystal shutter 37, the optical image of the subject supplied to the image sensor section 41 is not influenced by the illuminating light. If the time period $\Delta t$, during which the total liquid crystal display element 33 is in the light transmitting condition, is sufficiently short, it is not perceived by the human eyes that the displayed image is interrupted.

The bottom chart of FIG. 4 shows the electrical image signal EDS that is displayed on element 33.

Figure 5:
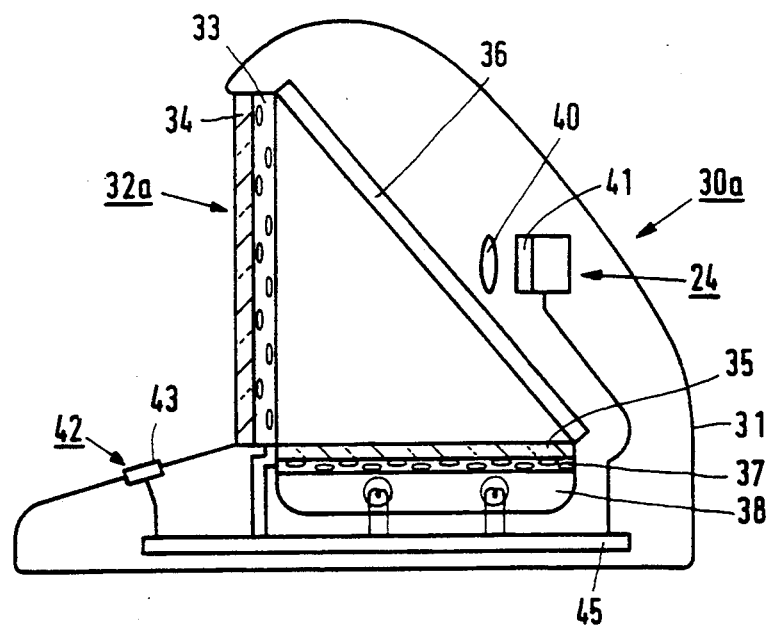
FIG. 5 is a cross-section of a second embodiment of the invention.

FIG. 5 shows a second embodiment of a videophone wherein the invention is used. In this embodiment the image display section 32a comprises only the liquid crystal display element 33 and a first polarizing plate 34 in contact with the front face of the display element. The second polarizing plate 35 is arranged now on the upper face of the liquid crystal shutter 37.

Since in this embodiment approximately half of a light from the subject in front of the apparatus passes through the liquid crystal display element 33 and, subsequently, reaches the image pick-up section 24 through the semi-transparent mirror 36, it is not necessary to bring the total liquid crystal display element 33 into the light transmitting condition during an image pick-up period Δt, but it is sufficient that the liquid crystal shutter 37 is brought to the light blocking condition during the time period Δt.

Figure 6:
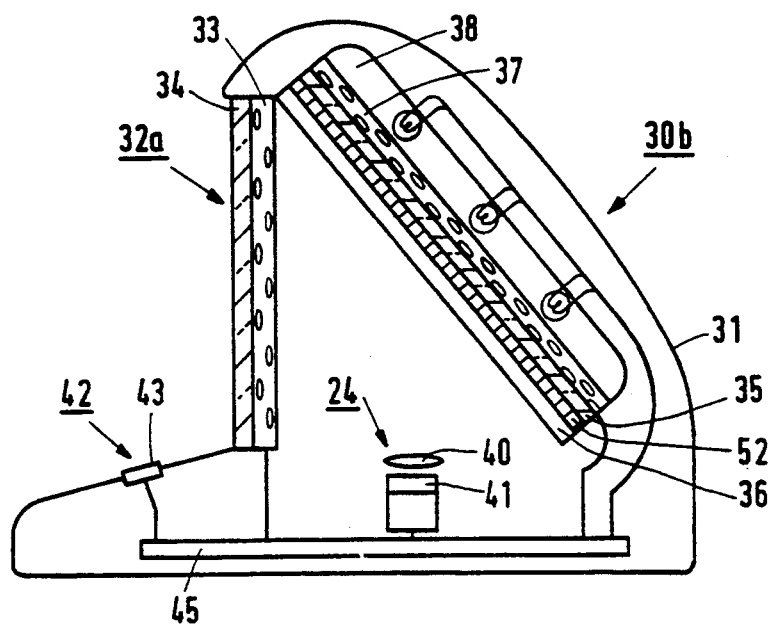
FIG. 6 is a cross-section of a third embodiment of the invention.
Figure 7:
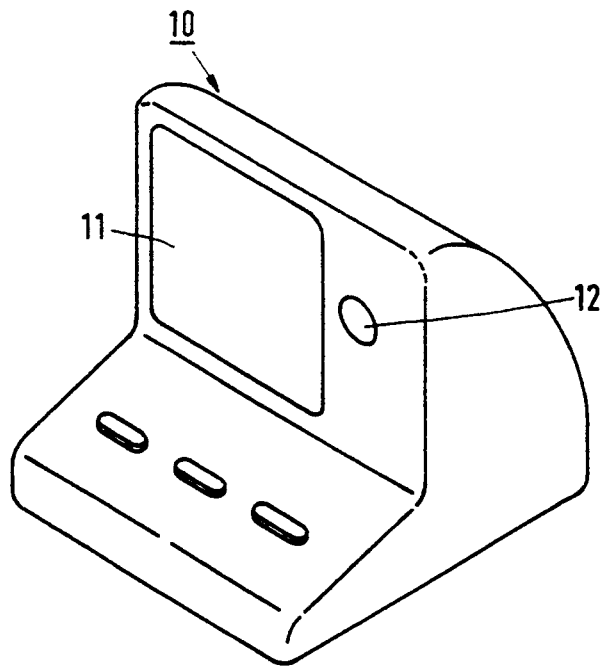
FIG. 7 is a perspective view of a first conventional image display and pick-up apparatus.
Figure 8:
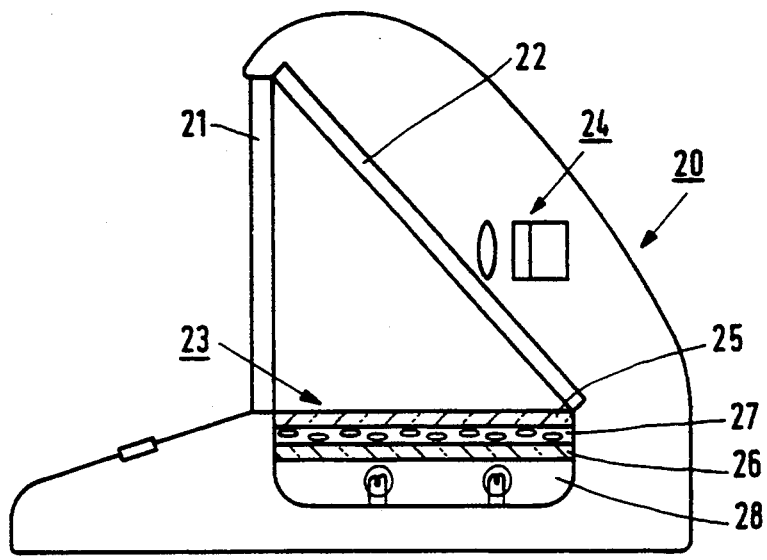
FIG. 8 is a cross-sectional view of a second conventional image display and pick-up apparatus.

FIG. 6 shows a third embodiment of a videophone wherein the invention is used. This embodiment differs from that of FIG. 5 in that the image pick-up section 24 and the portion including the polarizing plate 35, the liquid crystal shutter 37 and the light source 38 are interchanged. Further, a refraction plate 52 is arranged between the polarizing plate 35 and the semi-transparent mirror 36 such that the light having been emitted from the light source 38, and having passed through the semi-transparent mirror 36 is perpendicularly incident upon the liquid crystal display element 33.

In this embodiment, as well as in the embodiment illustrated in FIG. 5, the arrangement may be such that, in the normal display mode, the liquid crystal shutter 37 is in the light transmitting condition, while, during picking-up of an image, the liquid crystal shutter 37 is in the light blocking condition for a short period of time in synchronism with the operation of the image sensor section 24.

If in the embodiments described above, for example, a liquid crystal display element of GH type suitable for colour display is used as the liquid crystal display element 33, only the polarizing plates 34 and 35 are to be removed. In this case, the arrangement of other portions may be identical with that of each of the aforementioned embodiments.

We claim:

1. An image pick-up and display apparatus having an image pick-up section, a display section, a light source for illuminating said display section from the backside thereof and a partially transparent mirror, characterized in that said display section comprises a liquid crystal display element of the type that converts an electric signal into a visual image and which is illuminated from the backside thereof by light from said light source, in that said light is reflected on the backside of said liquid crystal display element from said mirror, in that said mirror is positioned rearwardly of said liquid crystal display element in light paths respectively between said light source and said liquid crystal display element and between said image pick-up section and said liquid crystal display element, in that an optical shutter for preventing a light beam emitted from said light source from reaching said mirror is positioned in the light path between said light source and said mirror in the vicinity of said light source and in that said display section is provided with a visual image essentially only by said conversion of an electric signal into a visual image by said liquid crystal element.

2. An image pick-up and display apparatus according to claim 1, characterized in that a control unit is provided, which provides a control signal for bringing said optical shutter into a light-blocking state when the image pick-up section is in an operating state.

3. An image pick-up and display apparatus according to claim 2, characterized in that the liquid crystal display element is provided on the front side thereof with a first polarizing plate and in that a second polarizing plate is provided in the light path between said light source and the semi-transparent mirror.

4. An image pick-up and display apparatus according to claim 2, characterized in that said control unit provides a second signal for rendering the whole liquid crystal display element in the light transmitting state when the image pick-up section is in an operating state.

5. An image pick-up and display apparatus according to claim 4, characterized in that said liquid crystal display element is provided on the front surface thereof with a first polarizing plate and on the rear surface thereof with a second polarizing plate.

6. An image pick-up and display apparatus according to claim 1, characterized in that the image pick-up section is disposed at one side of the semi-transparent mirror and both said liquid crystal display element and said light source are disposed at the other side of the semi-transparent mirror.

7. An image pick-up and display apparatus according to claim 2, characterized in that the image pick-up section is disposed at one side of the semi-transparent mirror and both said liquid crystal display element and said light source are disposed at the other side of the semi-transparent mirror.

8. An image pick-up and display apparatus according to claim 3, characterized in that the image pick-up section is disposed at one side of the semi-transparent mirror and both said liquid crystal display element and said light source are disposed at the other side of the semi-transparent mirror.

9. An image pick-up and display apparatus according to claim 4, characterized in that the image pick-up section is disposed at one side of the semi-transparent mirror and both said liquid crystal display element and said light source are disposed at the other side of the semi-transparent mirror.

10. An image pick-up and display apparatus according to claim 5, characterized in that the image pick-up section is disposed at one side of the semi-transparent mirror and both said liquid crystal display element and said light source are disposed at the other side of the semi-transparent mirror.

11. An image pick-up and display apparatus according to claim 1, characterized in that the image pick-up section is disposed on the same side of the semi-transparent mirror as said liquid crystal display element, and in that said light source is disposed on the other side of the semi-transparent mirror.

12. An image pick-up and display apparatus according to claim 2, characterized in that the image pick-up section is disposed on the same side of the semi-transparent mirror as said liquid crystal display element, and in that said light source is disposed on the other side of the semi-transparent mirror.

13. An image pick-up and display apparatus according to claim 3, characterized in that the image pick-up section is disposed on the same side of the semi-transparent mirror as said liquid crystal display element, and in that said light source is disposed on the other side of the semi-transparent mirror.

14. An image pick-up and display apparatus according to claim 4, characterized in that the image pick-up section is disposed on the same side of the semi-transparent mirror as said liquid crystal display element, and in that said light source is disposed on the other side of the semi-transparent mirror.

15. An image pick-up and display apparatus according to claim 5, characterized in that the image pick-up section is disposed on the same side of the semi-transparent mirror as said liquid crystal display element, and in that said light source is disposed on the other side of the semi-transparent mirror.

16. The image pick-up and display apparatus of claim 1, wherein the light source comprises a plurality of fluorescent lamps.

17. The image pick-up and display apparatus of claim 2, wherein the optical shutter is a liquid crystal shutter.

18. The image pick-up and display apparatus of claim 1 wherein the optical shutter is a liquid crystal shutter.

19. The image pick-up and display apparatus of claim 1 wherein a means is provided for driving the liquid display element to form an image thereon.

20. The image pick-up and display apparatus of claim 2 wherein a means is provided for driving the liquid display element to form an image thereon.

21. An image pick-up and display apparatus according to claim 11, claim 12, claim 13, claim 14 or claim 15, characterized in that a refraction plate for causing the light beam emitted from said light source to be incident onto the semi-transparent mirror perpendicularly to the surface thereof is provided between the semi-transparent mirror and said light source.

* * * * *